US011347953B2

(12) United States Patent
Isobe et al.

(10) Patent No.: US 11,347,953 B2
(45) Date of Patent: May 31, 2022

(54) PRINTING MANAGEMENT APPARATUS, PRINTING SYSTEM, AND COMPUTER READABLE MEDIUM

(71) Applicant: FUJIFILM BUSINESS INNOVATION CORP., Tokyo (JP)

(72) Inventors: Kimihiko Isobe, Yokohama (JP); Nobuhide Kawabata, Yokohama (JP); Ken Ogino, Yokohama (JP); Yuichiro Nishiwaki, Yokohama (JP); Takuma Suzuki, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 166 days.

(21) Appl. No.: 16/509,563

(22) Filed: Jul. 12, 2019

(65) Prior Publication Data
US 2020/0034587 A1 Jan. 30, 2020

(30) Foreign Application Priority Data
Jul. 25, 2018 (JP) .............................. JP2018-139800

(51) Int. Cl.
*G06K 7/14* (2006.01)
*G06K 19/06* (2006.01)
(Continued)

(52) U.S. Cl.
CPC .............. *G06K 7/1413* (2013.01); *B41J 3/01* (2013.01); *G06F 3/1207* (2013.01); *G06K 1/121* (2013.01);
(Continued)

(58) Field of Classification Search
CPC ........... G06K 7/1413; G06K 19/06009; G06K 1/121; B41J 3/01; G06F 3/1207;
(Continued)

(56) References Cited

U.S. PATENT DOCUMENTS 8,561,882 B2 * 10/2013 Stone ..................... G06Q 10/10
235/375
2004/0066527 A1 4/2004 Kloosterman et al.
(Continued)

FOREIGN PATENT DOCUMENTS

JP 2018-089922 A 6/2018

OTHER PUBLICATIONS

Oct. 25, 2019 Office Action issued in Australian Patent Application No. 2019200418.

*Primary Examiner* — Seung H Lee
(74) *Attorney, Agent, or Firm* — Oliff PLC

(57) ABSTRACT

A printing management apparatus includes: a receiving unit that receives order information about a printed material and print data of the printed material; a generating unit that generates bar code information about a bar code assigned to each page of the printed material based on the order information; an output unit that outputs the print data and the bar code information to a printer for executing processing including printing of the printed material; an acquiring unit that, in response to a failure occurring in the processing executed by the printer on a failure page, acquires the bar code information about the bar code assigned to the failure page; and a controller that controls the output unit so that the output unit outputs the bar code information about the failure page and reprint data of a reprinted material including the failure page to the printer.

19 Claims, 7 Drawing Sheets

(51) Int. Cl.
*G06K 1/12* (2006.01)
*B41J 3/01* (2006.01)
*G06F 3/12* (2006.01)

(52) U.S. Cl.
CPC ........ G06K 19/06009 (2013.01); *G06F 3/122* (2013.01)

(58) Field of Classification Search
CPC ........ G06F 3/122; G06F 3/1234; G06F 3/121; G06F 3/1285; G06F 3/1208
See application file for complete search history.

(56) References Cited

U.S. PATENT DOCUMENTS

2009/0161149 A1* 6/2009 Noguchi ............ H04N 1/00334
358/1.15
2015/0169259 A1 6/2015 Miyata

* cited by examiner

INVARIABLE PRINTING

PRINTING MANAGEMENT APPARATUS, PRINTING SYSTEM, AND COMPUTER READABLE MEDIUM

CROSS-REFERENCE TO RELATED APPLICATIONS

This application is based on and claims priority under 35 USC 119 from Japanese Patent Application No. 2018-139800 filed on Jul. 25, 2018.

BACKGROUND

Technical Field

The present invention relates to a printing management apparatus, a printing system, and a computer readable medium.

Related Art

JP-A-2018-089922 discloses an information processing system for producing a book including plural pages. The information processing system includes instruction acceptance means for accepting printing instructions about the book, print data generation means for generating print data including an inspection mark for inspecting a printed result on any page of the book about which the instruction acceptance means accepts the printing instructions, printing means for doing printing based on the print data generated by the print data generation means, inspection means for inspecting the inspection mark on any page of a printed material printed by the printing means, management means for managing an inspected result with the printed material associated with the inspected result by the inspection means, and rejection means for rejecting the printed material corresponding to the inspected result printed by the printing means when the inspected result managed by the management means is an inspected result indicating a defect in printing.

SUMMARY

Printing processing has become small lots, and printing processing and post-processing by quick delivery has been evaluated. This requires design of a workflow capable of consistently managing each of the steps of reception and placement of orders of printing processing, production management, printing processing, post-processing, and shipment.

A printed material is produced through various steps. The need for reprinting processing or post-processing due to trouble in any of the steps requires a more complicated processing flow. A problem in a case where trouble occurs in the post-processing step is exemplified as follows. For example, when producing books different one by one, each of which including components of book covers and texts, the texts need to correspond to the book cover. That is, a text of book A is associated with a book cover of book A, and a text of book B is associated with a book cover of book B, for example.

In this case, when a post-processing device is connected to a subsequent stage of a printer for printing the text, a stop of a bookbinding line every time the printer fails in printing of one copy decreases production efficiency. Because of this, the bookbinding line may be designed to reject the failure book on the way and minimize the stop of the bookbinding line. Then, the rejected book must be reproduced. This has a problem in that it is very difficult to identify the rejected book and reprint and post-process the book cover and the text corresponding to the identified book and it takes time.

Also, when the printed material is printed, raster image data in which a unique machine-readable optical code such as a one-dimensional barcode or a matrix barcode (two-dimensional barcode) is added to each page of print data provided in, for example, a PDF (Portable Document Format) may be generated and printed. When the printer fails in printing on a certain page and reprints the printed material, the raster image data of the bar code and the print data of all the pages including the failure page on which the printer fails in printing are generated, and the raster image data of the bar code is embedded in the raster image data of the print data generated, and final raster image data is generated. This has a problem in that a high load is applied to generation of the raster image data together with an increase in the amount of data, particularly in the case of doing printing of plural copies.

Aspect of non-limiting embodiments of the present disclosure relates to provide a printing management apparatus, a printing system, and a computer readable medium capable of efficiently reprinting a reprinted material including a failure page on which a failure occurs in a processing by a printer as compared with the case of printing a bar code assigned to each page of the printed material with the bar code embedded in print data.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a printing management apparatus including: a receiving unit that receives order information about a printed material and print data of the printed material; a generating unit that generates bar code information about a bar code assigned to each page of the printed material based on the order information; an output unit that outputs the print data and the bar code information to a printer for executing processing including printing of the printed material; an acquiring unit that, in response to a failure occurring in the processing executed by the printer on a failure page, acquires the bar code information about the bar code assigned to the failure page; and a controller that controls the output unit so that the output unit outputs the bar code information about the failure page and reprint data of a reprinted material including the failure page to the printer

BRIEF DESCRIPTION OF THE DRAWINGS

Exemplary embodiment(s) of the present invention will be described in detail based on the following figures, wherein.

DETAILED DESCRIPTION

An exemplary embodiment of the invention will hereinafter be described with reference to the drawings.

Figure 1:
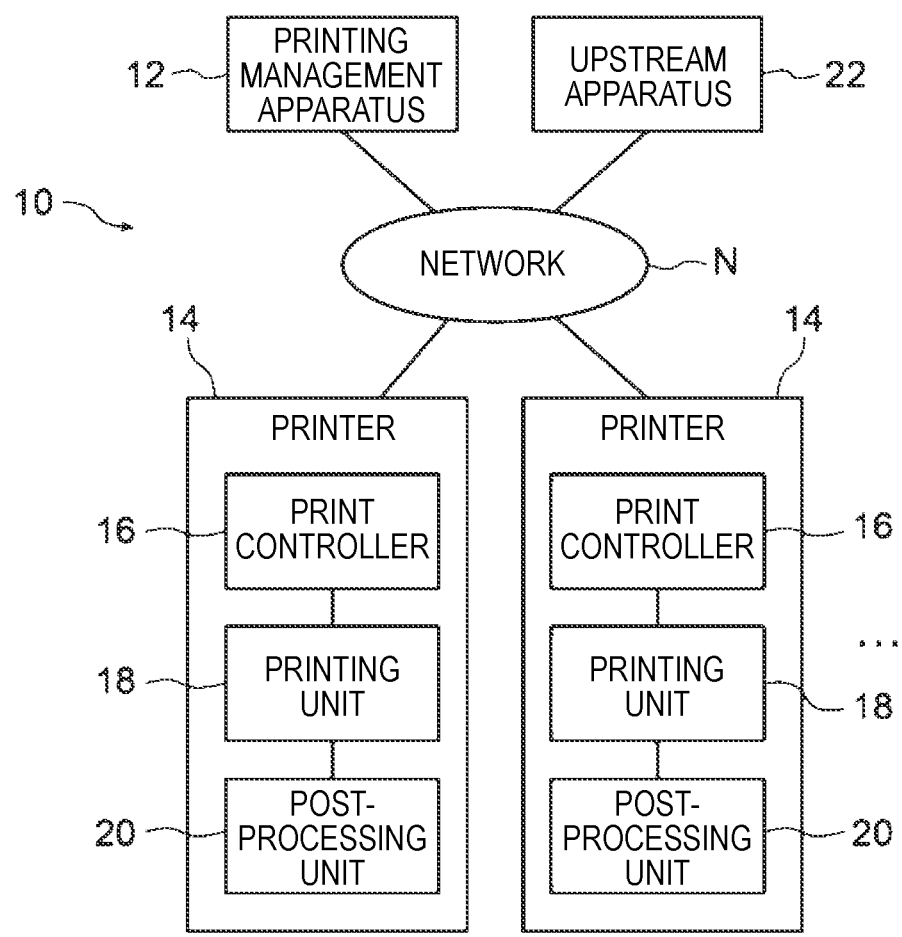
FIG. 1 is a configuration diagram of a printing system.

FIG. 1 is a diagram showing a schematic configuration of a printing system 10 in the present exemplary embodiment.

As shown in FIG. 1, the printing system 10 is configured to make wired or wireless connection between a printing management apparatus 12 and plural printers 14 through a network N such as the Internet.

Also, an upstream apparatus 22 is connected to the network N. The printing management apparatus 12 receives print data and order information about printed material from the upstream apparatus 22 through the network N, and generates bar code information based on the received order information. Also, the printing management apparatus 12 selects the printer 14 for printing the printed material, and sends the order information and the print data to the selected printer 14, thereby giving printing instructions.

The printer 14 includes a print controller 16, a printing unit 18, and a post-processing unit 20. The print controller 16 generates first raster image data from the print data sent from the printing management apparatus 12, and also generates second raster image data of a bar code such as a two-dimensional bar code based on the bar code information sent from the printing management apparatus 12, and generates composite raster image data by combining both of the first and second raster image data. Then, the print controller 16 outputs the generated raster image data to the printing unit 18.

The printing unit 18 prints an image based on the raster image data on a continuous form sheet such as a roll sheet by, for example, an ink jet method or an electrophotographic method.

The post-processing unit 20 has a function of executing post-processing such as a cutting step of cutting the continuous form sheet according to a break of a page, a folding step of folding the cut sheet, a bookbinding step of binding the folded sheets, and a sheet cutting step of cutting a bound book.

Also, the printing unit 18 has a function of reading bar code information about a failure page on which the printing unit 18 fails in printing and sending the bar code information to the printing management apparatus 12. Similarly, the post-processing unit 20 has a function of reading bar code information about a failure page on which the post-processing unit 20 fails in post-processing and sending the bar code information to the printing management apparatus 12.

Next, a functional configuration of the printing management apparatus 12 will be described.

Figure 2:
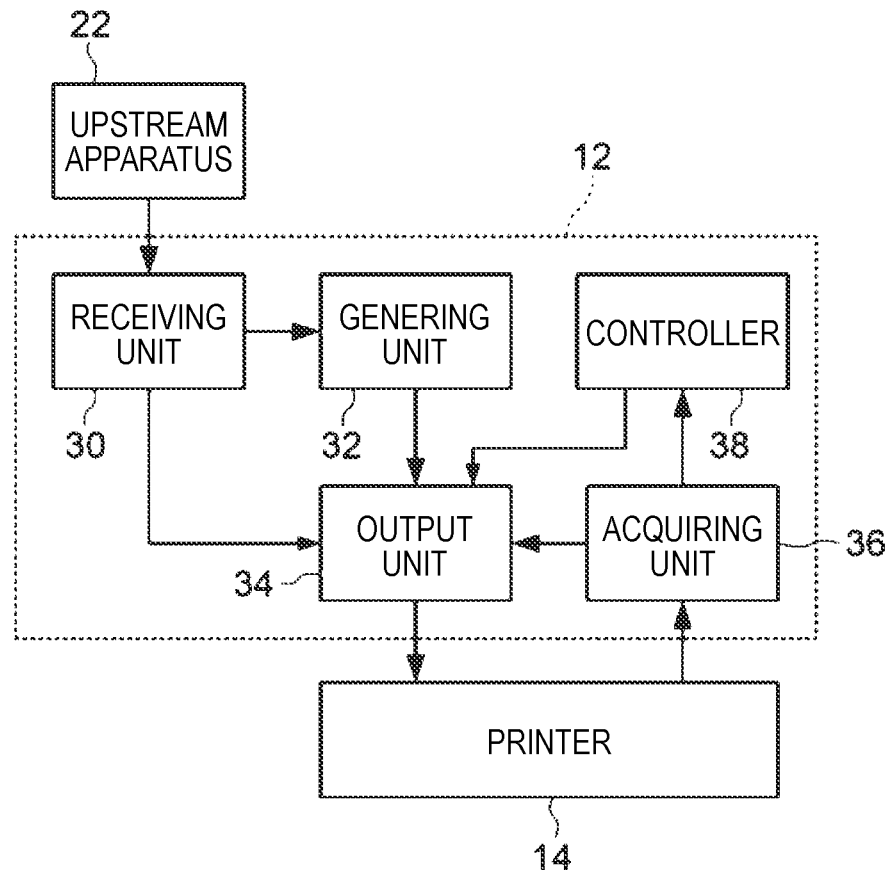
FIG. 2 is a functional block diagram of an image forming apparatus.

As shown in FIG. 2, the printing management apparatus 12 functionally includes a receiving unit 30, a generating unit 32, an output unit 34, an acquiring unit 36, and a control part 38.

The receiving unit 30 receives order information about printed material and print data of the printed material from the upstream apparatus 22. The order information is information about an order for the printed material, and includes information such as an order number, a product number, a part number, the number of copies, the number of pages, and record detailed information.

Here, the order number is a number assigned every time the printed material is ordered. The product number is a number assigned to a product, that is, the printed material. The part number is a number assigned to each part forming the printed material. The part refers to, for example, a book cover, a text, and a jacket. The number of copies is the number of copies of the printed material to be printed. The number of pages is the number of pages forming the printed material.

The record detailed information is information representing a correspondence relation among a record number of a record described below, the number of pages of page images included in the print data, a printing format representing double-sided printing or single-sided printing, and the number of impositions of page images imposed on one sheet. This record detailed information specifies a break of the record.

The print data is a set of page images of each page representing the contents of print, and is provided in, for example, a PDF (Portable Document Format). In addition, the format of the print data is not limited to the PDF.

The generating unit 32 generates bar code information about a bar code assigned to each page of the printed material based on the order information received by the receiving unit 30.

The bar code information includes information such as an order number, a product number, a record number, a group number, a part number, the number of reprints, the total number of sheets, and a sheet number.

The order number, the product number, and the part number use information included in the order information. The record number is a number assigned to each record (book). The printed material printed per order may include plural records. Also, a kind of printing of the printed material includes invariable printing and variable printing.

The invariable printing means that all the records have the same contents of print when the plural records are included in the printed material for one order. Consequently, for the invariable printing, booklets with the same contents of print are printed by the number of records.

Also, the variable printing means that the records have the different contents of print when the plural records are included in the printed material for one order. For example, a text of each record is the same, but a name and address, an address, etc. of a book cover of each record differ. Consequently, for the variable printing, booklets with the different contents of print are printed by the number of records.

The group number is a number assigned to each group grouped according to a predetermined condition. For example, the same group number is assigned to the printed material which satisfies the condition that a kind of sheet is the same.

The number of reprints represents the number of reprints of a record represented by the record number. When the printer 14 prints the printed material and fails in printing on a part of the pages, the record including a failure page on which the printer 14 fails in printing is reprinted. In this case, the number of reprints is incremented.

The total number of sheets represents the sum of the number of sheets of each record. The number of sheets refers to the number of sheets necessary to print the records, that is, the number of recording media such as sheets. For example, when the printed material for one order includes three records of records 1 to 3 and the number of sheets of each record is "10", the total number of sheets becomes "30".

In addition, a plural page images may be imposed on one sheet. Also, the page images may be imposed on the back as well as the front of one sheet. That is, the page images of two pages may be printed on one sheet. Consequently, for example, when the number of impositions is "4" in double-sided printing, in the case of printing the printed material in which the number of images of the page images included in one record is "32", the number of sheets is a value "4" obtained by dividing 2 into a value "8" obtained by dividing the number of impositions ("4") into the number of images ("32").

The sheet number is assigned to each sheet. When the number of sheets is "4" as shown in the above example, the sheet numbers of the sheets become 1 to 4.

Figure 3:
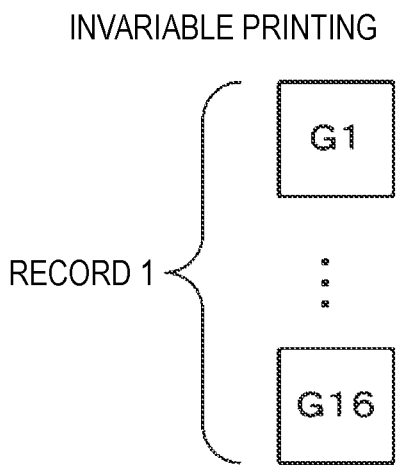
FIG. 3 is a diagram illustrating a record in invariable printing.

An example of an imposition in invariable printing will be described with reference to FIGS. 3 and 4. For example, as shown in FIG. 3, in the invariable printing, printed material includes a record 1, and the record 1 includes 16 page images G1 to G16.

Figure 4:
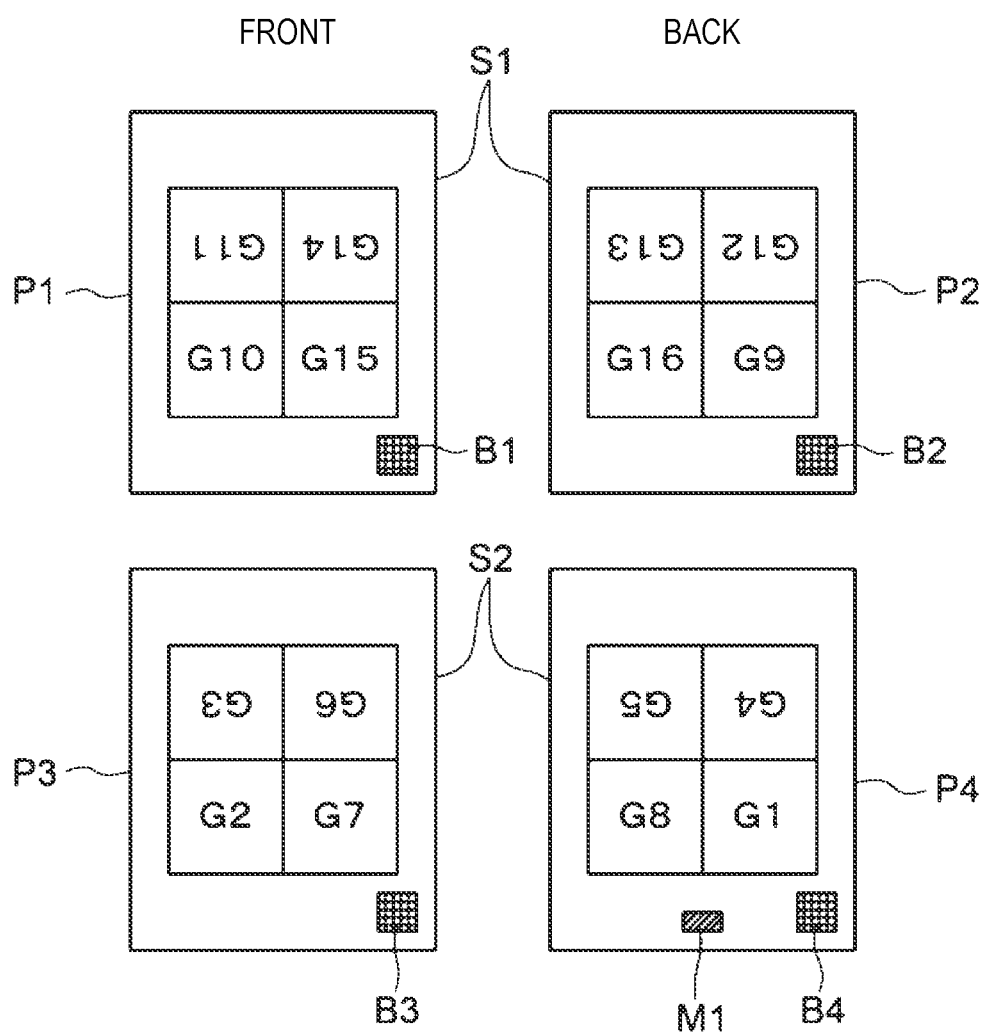
FIG. 4 is a diagram illustrating an imposition in the invariable printing.

When the number of impositions is "4" in double-sided printing, two sheets S1, S2 are printed as shown in FIG. 4. In addition, in the case of doing printing of a plural copies, the same sheets as the sheets S1, S2 are printed repeatedly.

As shown in FIG. 4, the front of the sheet S1 is the first page P1, and the back of the sheet S1 is the second page P2. Then, the page images G10, G11, G14, G15 are imposed on the page P1. Also, the page images G9, G12, G13, G16 are imposed on the page P2. In addition, in FIG. 4, directions of numerals G1 to G16 show directions of images.

The front of the sheet S2 is the third page P3, and the back of the sheet S2 is the fourth page P4. Then, the images G2, G3, G6, G7 are imposed on the page P3. Also, the images G1, G4, G5, G8 are imposed on the page P4.

Also, as shown in FIG. 4, a bar code is printed on each page, and bar codes B1 to B4 are printed on the pages P1 to P4. Further, a record break mark M1 showing a break of the record is printed on the last page P4 of the record 1.

Figure 5:
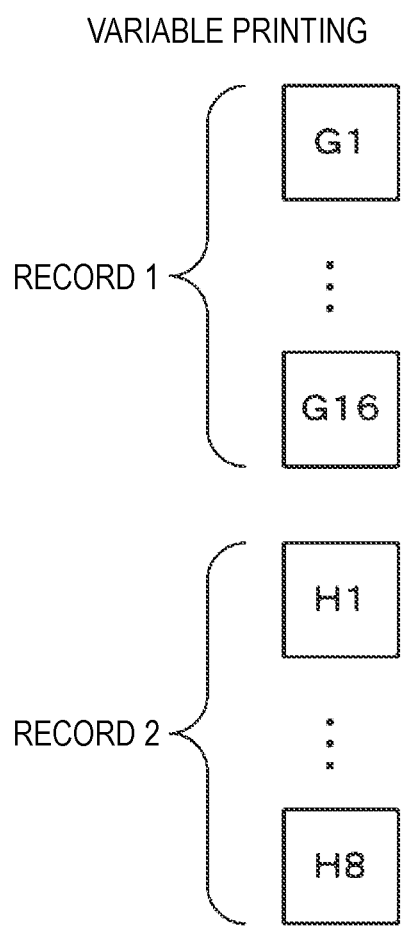
FIG. 5 is a diagram illustrating a record in variable printing.

Also, an example of an imposition in variable printing will be described with reference to FIGS. 5 and 6. For example, as shown in FIG. 5, in the variable printing, printed material includes records 1 and 2, and the record 1 includes 16 page images G1 to G16, and the record 2 includes 8 page images H1 to H8.

Figure 6:
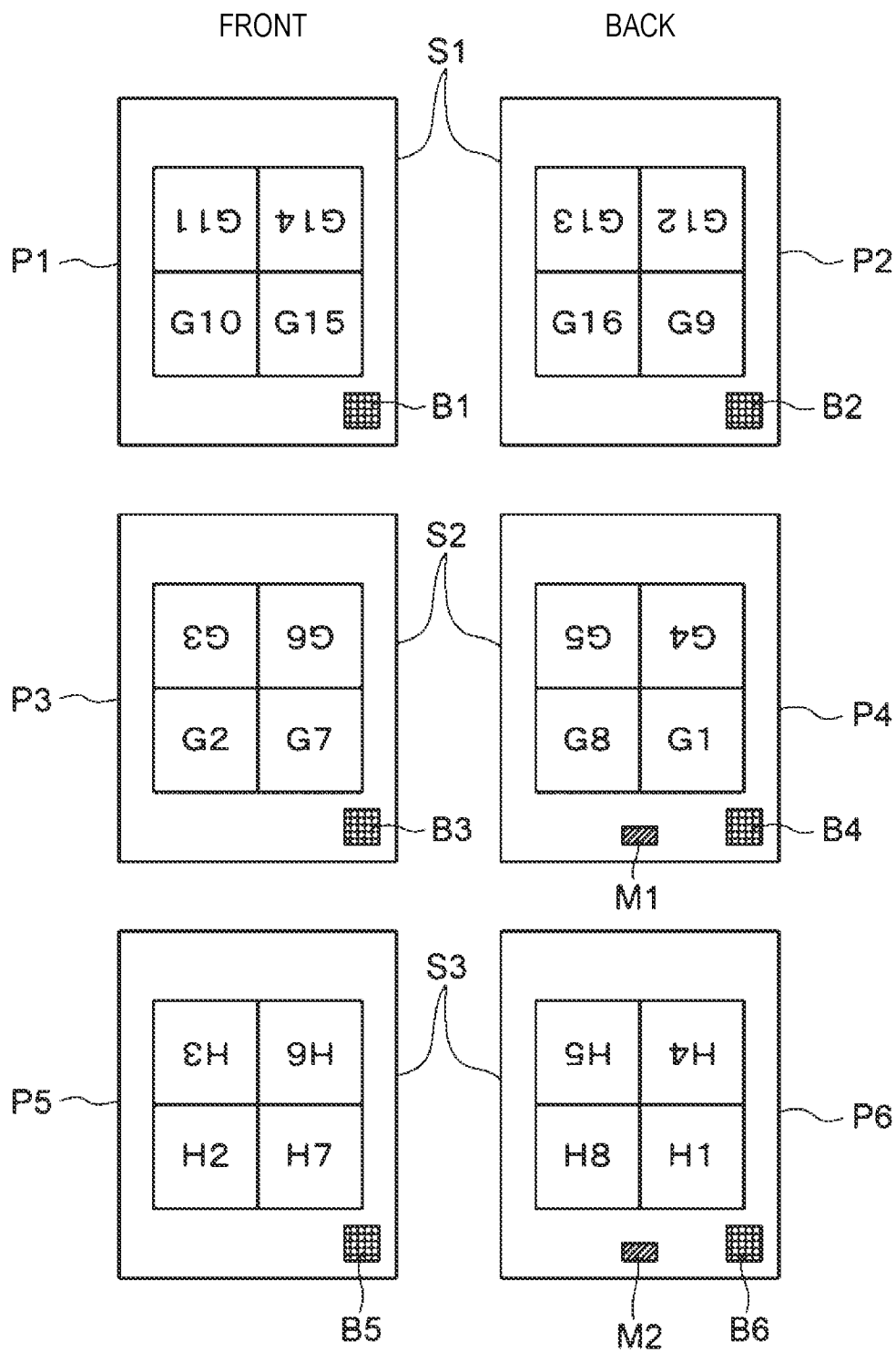
FIG. 6 is a diagram illustrating an imposition in the variable printing.

When the number of impositions is "4" in double-sided printing, three sheets S1 to S3 are printed as shown in FIG. 6. In addition, in the case of doing printing of a plural copies, the same sheets as the sheets S1 to S3 are printed repeatedly.

As shown in FIG. 6, impositions and bar codes of the sheets S1 and S2, and a record break mark are the same as those of FIG. 4. Also, the front of the sheet S3 is the fifth page P5, and the back of the sheet S3 is the sixth page P6. Then, the images H2, H3, H6, H7 are imposed on the page P5, and the images H1, H4, H5, H8 are imposed on the page P6. Also, bar codes B5 and B6 are printed on the pages P5 and P6. Further, a record break mark M2 showing a break of the record is printed on the last page P6 of the record 2.

The output unit 34 outputs the print data received by the receiving unit 30 and the bar code information generated by the generating unit 32 to the printer 14 for executing processing including printing of the printed material.

When the print data and the bar code information are received, the print controller 16 generates raster image data by the total number of sheets based on the received print data, and also generates raster image data of a bar code combined with each page based on the bar code information. Further, raster image data of the record break mark is generated on the last page of the record. Then, raster image data obtained by combining each of the raster image data is generated by the total number of sheets. Then, the raster image data generated by the total number of sheets is outputted to the printing unit 18. The printing unit 18 prints images on a continuous form sheet based on the raster image data sent from the print controller 16.

The post-processing unit 20 executes post-processing such as a cutting step of cutting the continuous form sheet printed in the printing unit 18 according to a break of a page, a folding step of folding the cut sheet, a bookbinding step of binding the folded sheets, and a sheet cutting step of cutting a bound book.

Also, the printing unit 18 reads a bar code assigned to a failure page on which the printing unit 18 fails in printing, and acquires bar code information, and sends the acquired bar code information to the printing management apparatus 12. Similarly, the post-processing unit 20 reads a bar code assigned to a failure page on which the post-processing unit 20 fails in post-processing, and acquires bar code information, and sends the acquired bar code information to the printing management apparatus 12.

The acquiring unit 36 acquires the bar code information about the bar code assigned to the failure page on which the printer 14 fails, that is, the printing unit 18 or the post-processing unit 20 fails, from the printer 14.

The control part 38 controls the output unit 34 so that the bar code information about the bar code assigned to the failure page and reprint data of reprinted material including the failure page, that is, reprint data which is print data of a record including the failure page are outputted to the printer 14.

Figure 7:
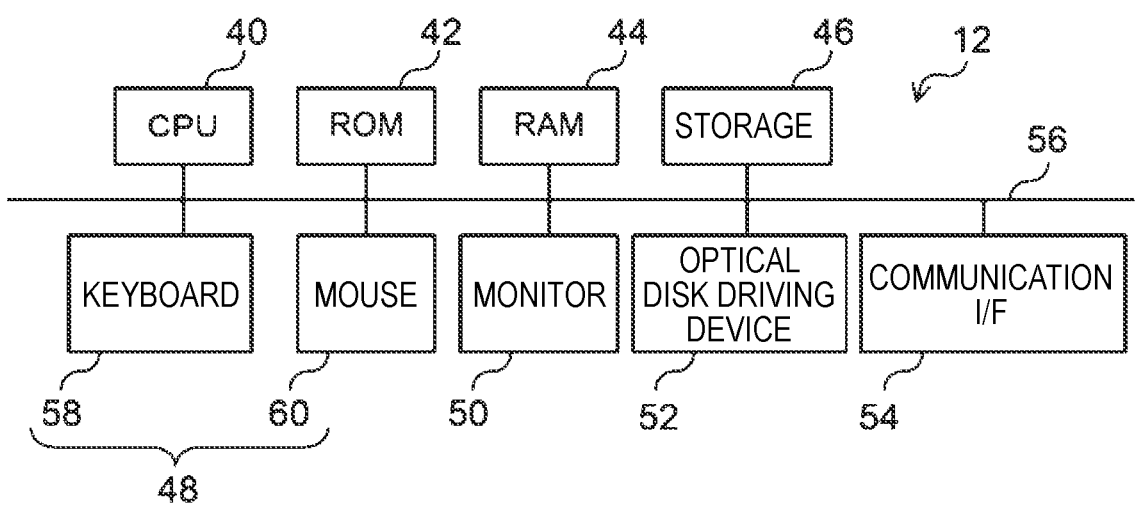
FIG. 7 is a block diagram showing an electrical configuration of the image forming apparatus.

FIG. 7 is a block diagram showing a hardware configuration of the printing management apparatus 12 according to the present exemplary embodiment.

As shown in FIG. 7, the printing management apparatus 12 has a CPU (Central Processing Unit) 40, ROM (Read Only Memory) 42, RAM (Random Access Memory) 44, a storage 46, an operation part 48, a monitor 50, an optical disk driving device 52, and a communication interface 54. Each configuration is communicably interconnected through a bus 56.

In the present exemplary embodiment, by way of example, the storage 46 stores a printing management program for executing printing management processing. The CPU 40 is a central processing unit, and executes various programs or controls each configuration. That is, the CPU 40 reads a program out of the storage 46, and executes the program using the RAM 44 as a work area. The CPU 40 performs the control of each configuration and arithmetic processing according to the programs recorded on the storage 46.

The ROM 42 stores various programs and various data. The RAM 44 temporarily stores a program or data as the work area.

The storage 46 is constructed of an HDD (Hard Disk Drive) or an SSD (Solid State Drive), and stores various data and various programs including an operating system.

The operation part 48 includes a keyboard 58, and a pointing device such as a mouse 60, and is used for doing various inputs.

The monitor 50 is, for example, a liquid crystal display, and displays various pieces of information. The monitor 50 may function as the operation part 48 by adopting a touch panel method.

The optical disk driving device 52 reads data stored in various recording media (a CD-ROM, a Blu-ray Disc, etc.), and writes the data into the recording media.

The communication interface 54 is an interface for communicating with other equipment such as the printer 14 and the upstream apparatus 22. As the communication interface 54, for example, Ethernet (registered trademark), FDDI, Wi-Fi (registered trademark), USB (Universal Serial Bus), and IEEE1394 standards are used.

Figure 8:
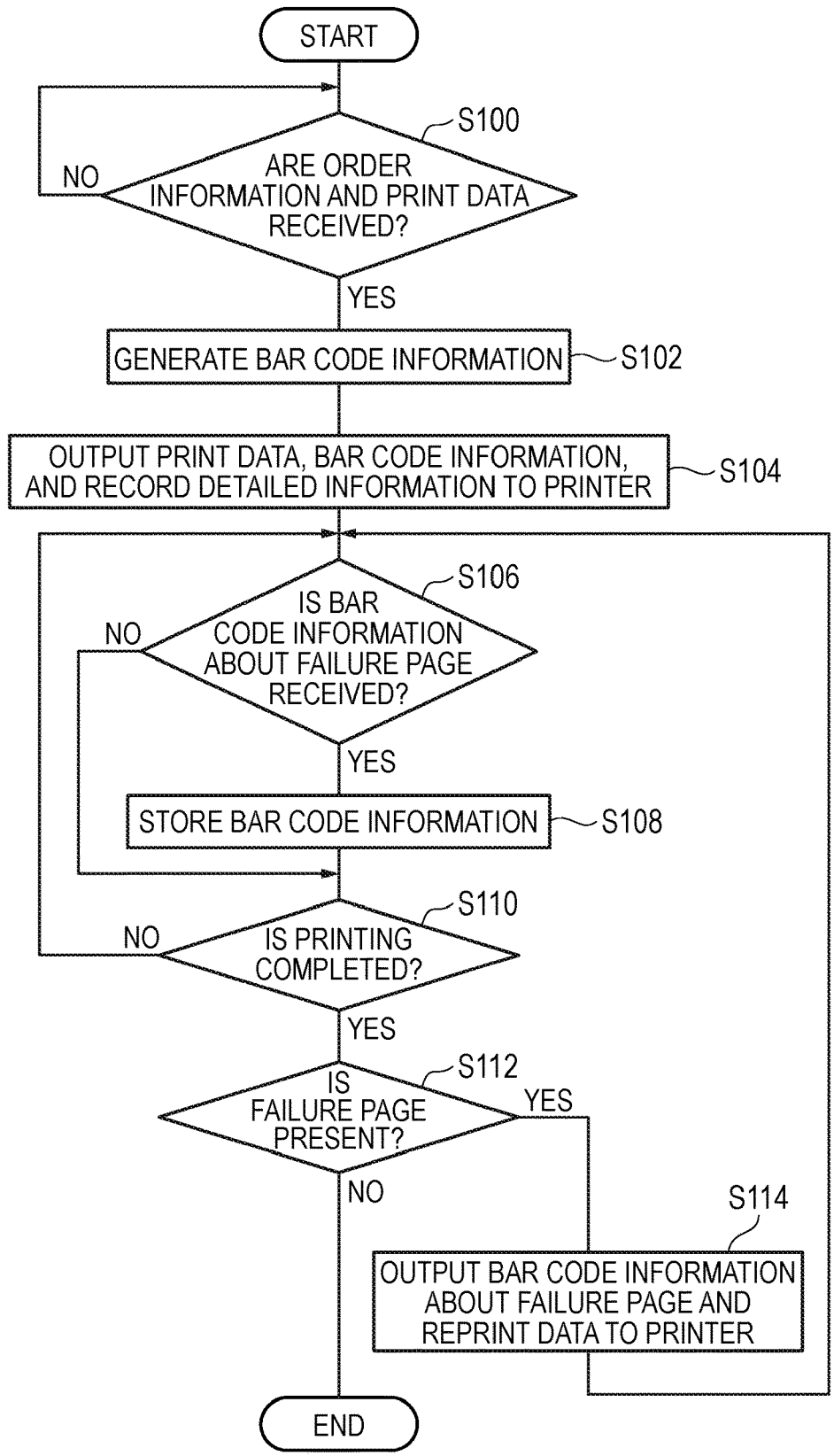
FIG. 8 is a flowchart showing a flow of information processing executed by the image forming apparatus.

Next, a flow of printing management processing executed by the CPU 40 of the printing management apparatus 12 will be described with reference to a flowchart shown in FIG. 8.

In step S100, it is determined whether or not order information and print data are received from the upstream apparatus 22. Then, when the order information and the print data are received from the upstream apparatus 22, the flowchart proceeds to step S102. On the other hand, when the order information and the print data are not received from the upstream apparatus 22, the flowchart waits until the order information and the print data are received from the upstream apparatus 22.

In addition, for example, when the print data of the printed material ordered in the past has already been stored in the storage 46, it may be constructed so that only the order information is received from the upstream apparatus 22 and the print data is identified by the received order information and the identified print data is read out of the storage 46.

In step S102, bar code information about a bar code assigned to each page of the printed material is generated based on the order information received in step S100. For example, when the order details indicate variable printing including the records 1, 2 as shown in FIG. 5, the bar code information for generating the bar codes B1 to B6 as shown in FIG. 6 is generated.

In step S104, the print data received in step S100, the bar code information generated in step S102, and record detailed information included in the order information received in step S100 are outputted to the printer 14.

For example, when the order details indicate variable printing including the records 1, 2 as shown in FIG. 5, the print data including the page images G1 to G16 of FIG. 5, the bar code information for generating the bar codes B1 to B6 as shown in FIG. 6, and the record detailed information are outputted to the printer 14. Accordingly, the print controller 16 of the printer 14 generates first raster image data of each page of the sheets S1 to S3 from the print data sent from the printing management apparatus 12. Also, the print controller 16 generates second raster image data of a bar code such as a two-dimensional bar code assigned to each page of the sheets S1 to S3 based on the bar code information sent from the printing management apparatus 12. Also, the print controller 16 generates third raster image data of the record break marks M1, M2 assigned to the pages P4, P6 based on the record detailed information.

Then, the print controller 16 combines the first raster image data of each page of the sheets S1 to S3 with the second raster image data of the bar code. Also, on a page of a break of a record, the third raster image data of the record break mark is combined. Then, the combined raster image data is outputted to the printing unit 18. Accordingly, the printing unit 18 prints images on a continuous form sheet based on the raster image data sent from the print controller 16. In addition, in the case of printing printed material of a plural copies, for the second copy or later, the first raster image data of each page and the third raster image data of the record break mark are common, and only the second raster image data of the bar code of the second copy or later differs from those of the first copy. Accordingly, in the case of generating the second raster image data of the second copy or later, the print controller 16 has only to generate the second raster image data of the bar code and combine the second raster image data with the first raster image data of each page and the third raster image data of the record break mark of the first copy. This reduces the load on processing of generation of the raster image data.

After printing is completed, the post-processing unit 20 executes the post-processing such as the cutting step, the folding step, the bookbinding step, and the sheet cutting step described above.

The printing unit 18 reads a bar code assigned to a failure page on which the printing unit 18 fails in printing, and acquires bar code information, and sends the acquired bar code information to the printing management apparatus 12. Similarly, the post-processing unit 20 reads a bar code assigned to a failure page on which the post-processing unit 20 fails in post-processing, and acquires bar code information, and sends the acquired bar code information to the printing management apparatus 12.

In step S106, it is determined whether or not the bar code information about the failure page is received from the printing unit 18 or the post-processing unit 20. Then, when the bar code information about the failure page is received, the flowchart proceeds to step S108, and when the bar code information about the failure page is not received, the flowchart proceeds to step S110.

In step S108, the received bar code information is stored in the storage 46.

In step S110, it is determined whether or not printing of the printed material is completed. Concretely, for example, it is determined whether or not printing of the printed material is completed by determining whether or not notification about the completion of printing is received from the printer 14.

When printing of the printed material is completed, the flowchart proceeds to step S112, and when printing of the printed material is not completed, the flowchart proceeds to step S106.

In step S112, it is determined whether or not the failure page is present. That is, it is determined whether or not determination in step S106 is a yes. Then, when the failure page is present, the flowchart proceeds to step S114, and when the failure page is not present, the present routine is ended.

In step S114, the bar code information about the bar code assigned to the failure page is read out of the storage 46, and the number of reprints included in the bar code information read out is incremented, thereby updating the bar code information. Also, the record including the failure page is identified based on the record detailed information and the bar code information about the failure page.

Then, the updated bar code information, and reprint data which is print data of the record including the failure page are outputted to the print controller 16 of the printer 14. Accordingly, the printing unit 18 reprints the record including the failure page, and the post-processing unit 20 executes post-processing of the reprinted material. In addition, the printer 14 for giving reprinting instructions may be the printer 14 different from the printer 14 for giving original printing instructions. Also, a plural printers 14 rather than one printer 14 may give reprinting instructions in a distributed manner.

Thus, in the present exemplary embodiment, when the printing unit 18 fails in printing, or when the post-processing unit 20 fails in post-processing, the printing management apparatus 12 simply outputs the bar code information about the failure page and the print data of the record including the failure page to the printer 14, thereby reducing the load on processing. This reduces the load on processing of generation of the raster image data, thereby doing reprinting efficiently. Also, in the case of doing printing of a plural copies, for the second copy or later, the print controller 16 of the printer 14 has only to generate the second raster image data of the bar code. This reduces the load on processing of generation of the raster image data.

The exemplary embodiment has been described above, but the invention is not limited to the scope of the exemplary embodiment described above. Various changes or improvements may be made in the exemplary embodiment without departing from the gist of the invention, and forms with the changes or the improvements made are also included in the technical scope of the invention.

For example, the exemplary embodiment describes the case where the printer 14 is the printer for printing images on a continuous form sheet such as a roll sheet, but the printer 14 may be a printer for printing images on a cut sheet.

Also, the exemplary embodiment describes the form in which the printing management program is installed on the storage 46, but is not limited to this form. The printing management program according to the exemplary embodiment may be provided in the form recorded on a computer-readable storage medium. For example, the printing management program according to the invention may be provided in the form recorded on an optical disk such as CD (Compact Disc)-ROM and DVD (Digital Versatile Disc)-ROM, or the form recorded on semiconductor memory such as USB (Universal Serial Bus) memory and a memory card. Also, the printing management program according to the exemplary embodiment may be acquired from an external device through a communication line connected to the communication interface 54.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printing management apparatus comprising:
a processor configured to:
receive order information about a printed material and print data of the printed material;
generate bar code information about a bar code assigned to each page of the printed material based on the order information;
output the print data and the bar code information to a printer for executing processing including printing of the printed material;
in response to a failure page being determined in the printed material, acquire the bar code information about the bar code assigned to the failure page, the failure page being a page on which the processing by the printer failed, the bar code information being sent from the printer after the printer reads the bar code assigned to the failure page of the printed material to acquire the bar code information; and
perform control to output the bar code information about the failure page and reprint data of a reprinted material including the failure page to the printer.

2. The printing management apparatus according to claim 1,
wherein the bar code information includes a number of reprint, and
the processor is configured to increment the number of reprint in the bar code information about the bar code assigned to the failure page by one.

3. The printing management apparatus according to claim 2,
wherein the printed material includes a plurality of records, and
the processor is configured to perform control to output record detailed information for specifying a break of the plurality of records to the printer.

4. The printing management apparatus according to claim 1,
wherein the printed material includes a plurality of records, and
the processor is configured to perform control to output record detailed information for specifying a break of the plurality of records to the printer.

5. A printing system comprising:
the printing management apparatus according to claim 1, wherein
the printer prints the printed material based on the print data and the bar code information outputted from the printing management apparatus, and that sends the bar code information about the bar code assigned to the failure page on which a failure occurs in printing to the printing management apparatus.

6. The printing system according to claim 5,
wherein the printer comprises:
a print controller that generates first raster image data based on the print data outputted from the printing management apparatus and second raster image data of a bar code based on the bar code information outputted from the printing management apparatus to generate composite raster image data by combining the first raster image data with the second raster image data, and
the printer prints an image based on the composite raster image data on a recording medium.

7. The printing system according to claim 6,
wherein, for a second copy or later of the printed material, the print controller generates only the second raster image data of the bar code, and combines the second raster image data generated for the second copy or later with the first raster image data generated for a first copy.

8. A printing system comprising:
the printing management apparatus according to claim 2, wherein
the printer prints the printed material based on the print data and the bar code information outputted from the printing management apparatus, and that sends the bar code information about the bar code assigned to the failure page on which a failure occurs in printing to the printing management apparatus.

9. The printing system according to claim 8,
wherein the printer comprises:
a print controller that generates first raster image data based on the print data outputted from the printing management apparatus and second raster image data of a bar code based on the bar code information outputted from the printing management apparatus to generate composite raster image data by combining the first raster image data with the second raster image data, and the printer prints an image based on the composite raster image data on a recording medium.

10. The printing system according to claim 9, wherein, for a second copy or later of the printed material, the print controller generates only the second raster image data of the bar code, and combines the second raster image data generated for the second copy or later with the first raster image data generated for a first copy.

11. A printing system comprising:
the printing management apparatus according to claim 4, wherein
the printer prints the printed material based on the print data and the bar code information outputted from the printing management apparatus, and that sends the bar code information about the bar code assigned to the failure page on which a failure occurs in printing to the printing management apparatus.

12. The printing system according to claim 11, wherein the printer comprises:
a print controller that generates first raster image data based on the print data outputted from the printing management apparatus and second raster image data of a bar code based on the bar code information outputted from the printing management apparatus to generate composite raster image data by combining the first raster image data with the second raster image data, and the printer prints an image based on the composite raster image data on a recording medium.

13. The printing system according to claim 12, wherein, for a second copy or later of the printed material, the print controller generates only the second raster image data of the bar code, and combines the second raster image data generated for the second copy or later with the first raster image data generated for a first copy.

14. The printing system according to claim 13, wherein the print controller generates third raster image data of a record break mark representing the break of the plurality of records based on the record detailed information for specifying the break of the plurality of records of the printed material, and combines the third raster image data with the first raster image data and the second raster image data of a page including the break.

15. A printing system comprising:
the printing management apparatus according to claim 3, wherein
the printer prints the printed material based on the print data and the bar code information outputted from the printing management apparatus, and that sends the bar code information about the bar code assigned to the failure page on which a failure occurs in printing to the printing management apparatus.

16. The printing system according to claim 15, wherein the printer comprises:
a print controller that generates first raster image data based on the print data outputted from the printing management apparatus and second raster image data of a bar code based on the bar code information outputted from the printing management apparatus to generate composite raster image data by combining the first raster image data with the second raster image data, and the printer prints an image based on the composite raster image data on a recording medium.

17. The printing system according to claim 16, wherein, for a second copy or later of the printed material, the print controller generates only the second raster image data of the bar code, and combines the second raster image data generated for the second copy or later with the first raster image data generated for a first copy.

18. The printing system according to claim 17, wherein the print controller generates third raster image data of a record break mark representing a break of a record based on record detailed information for identifying the break of the record of the printed material, and combines the third raster image data with the first raster image data and the second raster image data of a page of the break of the record.

19. A non-transitory computer readable medium storing a program causing a computer to execute a process for printing management, the process comprising:
receiving order information about a printed material and print data of the printed material;
generating bar code information about a bar code assigned to each page of the printed material based on the order information;
outputting the print data and the bar code information to a printer for executing processing including printing of the printed material;
acquiring, in response to a failure page being determined in the printed material, the bar code information about the bar code assigned to the failure page, the failure page being a page on which the processing by the printer failed, the bar code information being sent from the printer after the printer reads the bar code assigned to the failure page of the printed material to acquire the bar code information; and
outputting the bar code information about the failure page and reprint data of a reprinted material including the failure page to the printer.

* * * * *